(12) United States Patent
Wilson (10) Patent No.: US 9,645,415 B2
(45) Date of Patent: May 9, 2017

(54) ADJUSTABLE OPTICAL DEVICE

(71) Applicant: Tahirah Wilson, Atlanta, GA (US)

(72) Inventor: Tahirah Wilson, Atlanta, GA (US)

( * ) Notice: Subject to any disclaimer, the term of this patent is extended or adjusted under 35 U.S.C. 154(b) by 112 days.

(21) Appl. No.: 13/969,516

(22) Filed: Aug. 17, 2013

(65) Prior Publication Data

US 2015/0049292 A1 Feb. 19, 2015

(51) Int. Cl.
*G02C 11/02* (2006.01)
*G02C 5/20* (2006.01)
*G02C 11/00* (2006.01)

(52) U.S. Cl.
CPC ............... *G02C 11/02* (2013.01); *G02C 5/20* (2013.01); *G02C 11/10* (2013.01); *G02C 2200/26* (2013.01)

(58) Field of Classification Search
CPC .................................. G02C 11/02; G02C 7/108
USPC ....... 351/51, 52, 111, 116, 153, 158; 16/228
See application file for complete search history.

(56) References Cited

U.S. PATENT DOCUMENTS

| | | | |
|---|---|---|---|
| 5,114,218 A | 5/1992 | Black | |
| 5,185,620 A * | 2/1993 | Cooper | 351/52 |
| 5,386,254 A | 1/1995 | Kahaney | |
| 5,652,635 A * | 7/1997 | Kirschner | 351/52 |
| 6,224,208 B1 | 5/2001 | Pawlowski | |
| 6,652,093 B1 * | 11/2003 | Lamy | 351/51 |
| 7,637,609 B1 * | 12/2009 | Ifergan | 351/153 |
| 2012/0113381 A1 * | 5/2012 | Jacquier et al. | 351/51 |

OTHER PUBLICATIONS

U.S. Appl. No. 06/787,242, filed Mar. 15, 1988, James Jannard.
U.S. Appl. No. 12/158,541, filed Oct. 23, 2008, Marcus Leonardus.

* cited by examiner

*Primary Examiner* — Hung Dang
(74) *Attorney, Agent, or Firm* — John L Sotomayor (57) ABSTRACT

The present apparatus includes an optical device with an interlocking mechanism that provides the capability of the user to alternate the arms of the device. This ability allows the user to modify the color or design pattern in order to vary the look based on the environment or the liking of the user. In addition, the device may include a means to alternate colors or designs in conjunction with the interlocking mechanism. Lastly, the apparatus may include a capability that allows the user to obtain another user's electronic skin, design of their device, or nearby object by wireless communication.

19 Claims, 7 Drawing Sheets

ADJUSTABLE OPTICAL DEVICE

CROSS-REFERENCE TO RELATED APPLICATIONS

This application claims priority to Provisional U.S. Patent Application Ser. No. 61/684,802, filed Aug. 19, 2012, and titled "Adjustable Optical Device," which application in its entirety is incorporated by reference herein.

FIELD OF INVENTION

This invention relates generally to the field of optical devices that are worn over the eyes of a user. More specifically this invention relates to a method for a user to rotate an interlocking mechanism of an optical device to allow the user the ability to alter the color, design, and look of the optical device.

BACKGROUND OF INVENTION

This apparatus provides the user of an optical device the ability to modify the design or look of said device, without having to purchase another device. The intention of the device is to provide the user with the capability of altering the representation of the device based on the liking and the environment of the user.

U.S. Pat. No. 5,114,218 (Black), hereinafter referred to as Black, teaches an adjustable switch which adjusts the color with a liquid crystal energy voltage with a controlled cell which propagates the appropriately selected wavelength of white light. However, this invention does not teach a temperature sensored material, or a device powered by solar energy. It also does not teach the capability of sensoring between artificial and natural light. In addition, this invention does not teach an adjustment capability by means of a rotatable arm, but rather a switch.

U.S. patent application Ser. No. 06/787,242 (Jannard), hereinafter referred to as Jannard, teaches detachable parts of an optical device. This invention does not teach an interlocking mechanism used to rotate or change different styles. Therefore, this invention does not address the capability of adjusting the color, design, and look of the optical device with ease.

U.S. Pat. No. 5,386,254 (Kahaney), hereinafter referred to as Kahaney, teaches the adjustment capability of the temples on the optical device, by means of moving the temples into various notch lengths. However, this invention does not teach an ability of the arms being made of a flexible materials or an interlocking joint mechanisms capable of three hundred and sixty degree rotation.

U.S. Pat. No. 6,224,208 (Pawlowski), hereinafter referred to as Pawlowski, teaches an optical device that is made of a specific material that changes depending on specifically if the environment is a natural or artificial light, and will which change color based on that environment. However, this invention does not teach a sensor mechanism for facilitating this change, nor does it teach rotation of optical device arms.

Accordingly, it is an object of the present invention to provide optical devices which will change design through various means. It is another object of the present invention to provide optical devices which are stylish in shape and in color. It is another object of the present invention to provide optical devices designers another avenue for creativity when designing optical devices frames and arms which are easy to use, easy to manufacture, and comparatively cost effective.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

To resolve the problems mentioned above, an object of the present invention provides the user with the ability to adjust the color, design and look of the optical device by various means. The present embodiment includes an optical device with an interlocking mechanism that provides the capability of the user to alter the look of the optical device by rotating the side arms of the device, to accommodate various colors and designs of the device. This ability allows the user to modify the style, in order to vary the style based on their liking or the environment of the user.

In a separate embodiment, the user has the capability to easily switch the orientation of the ear portion of the arms as a result of a flexible material with which the side arms may be made from. Alternatively, the arms may extend straight over the ear so that any rotation of the arm does not change the orientation of the ear portion of the arm.

In addition, the device may include a means for electronically changing the design of the optical device where the changing means may include LEDs, a thermo chromic material, an electronic ink, or an electronic material.

A further embodiment may include a capability that allows the user to obtain a third-party device's electronic skin or design, by merely placing the user's optical device in the presence of the third-party device. This capability may also be accomplished by placing the user's optical device in proximity to any apparatus that contains a means for transmitting an electronic skin or design by some signal via means such as Bluetooth, zigby, Wi-Fi, RFID, NFC, etc.

Still other objects of the present apparatus will become readily apparent to those skilled in this art from the following description wherein there is shown and described the embodiments, simply by way of illustration of the best modes suited to carry out them out. As it will be realized, other different embodiments and several details are capable of modifications in various obvious aspects all without departing from the scope. Accordingly, the drawing and descriptions will be regarded as illustrative in nature and not as restrictive.

BRIEF DESCRIPTION OF THE DRAWINGS

Various exemplary embodiments will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

Figure 1:
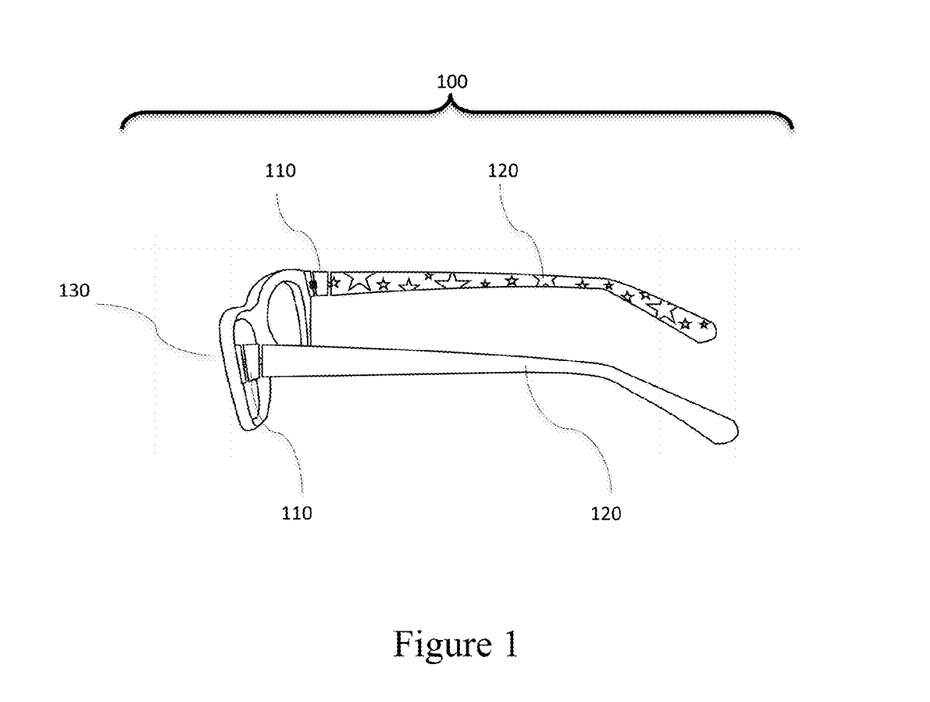
FIG. 1 is a perspective side view that depicts an optical device with a different design on the inner arm.

FIG. 1 depicts a perspective view of optical device 100 with a different design on inner arms 120. With particular reference to the above and below-mentioned figures, optical device 100, according to the invention, is designated as a whole by the reference number 100. The design pattern featured on optical device 100 may include, but is not limited to, a wide-array of shapes, colors, words, etc. Furthermore, the design pattern may be manipulated based upon personas. The personas may vary based upon a variety of situations or scenarios including, but not limited to: employment areas, casual areas, or business areas. For example, a work persona may include a more conservative design pattern whereas a more casual persona may include a bolder design pattern not suitable for the workplace. Interlocking mechanism 110 connects arms 120 to frame 130 of optical device 100. Interlocking mechanism 110 also allows for a three hundred and sixty degree rotation of arms 120. However, arms 120 may lock into place at a one hundred and eighty degree rotation also. Rotation of arm 120 will allow for various sides of arm 120 to be shown to onlookers as worn by the user. As represented by FIG. 1, one side of arm 120 is plain and the other side contains a star pattern. Various other designs, shapes, colors, words, etc. may be used to decorate arms 120.

Figure 2:
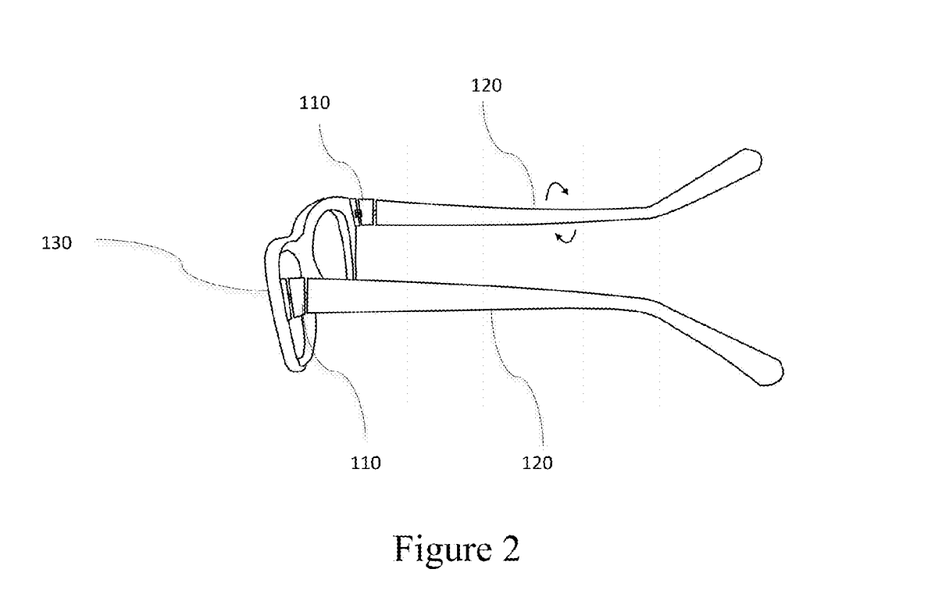
FIG. 2 is a perspective side view that depicts one of the optical device arms after a 180 degree rotation by use of the interlocking mechanism.
Figure 3:
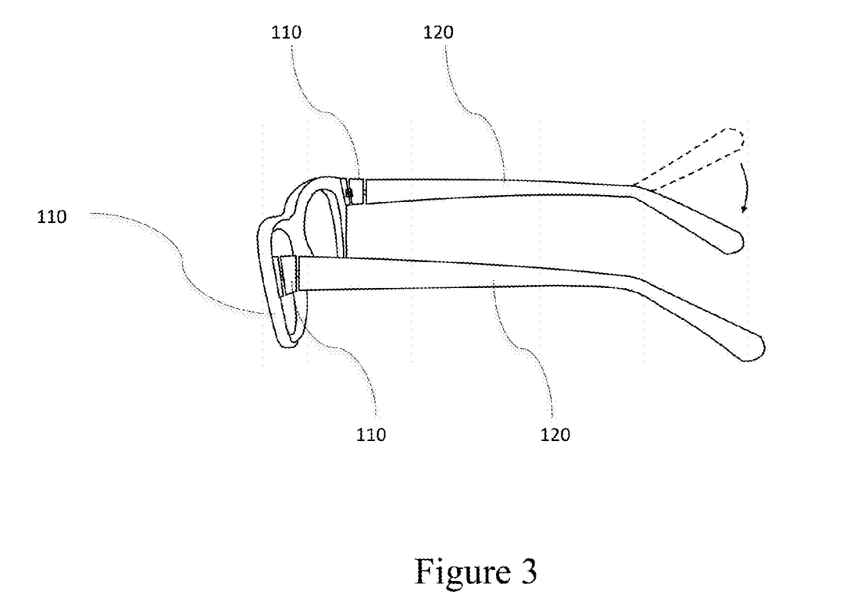
FIG. 3 is a perspective side view that depicts the flexible material of the optical device arm being adjusted to account for the 180 degree orientation change of the arm.

FIG. 2 is a perspective side view that depicts one of the optical device 100 arms 120 after one hundred eighty degree rotation by use of the interlocking mechanism 110. As evidenced by the illustration, arms 120 may rotate in a clockwise or counter-clockwise direction relative to frame 130. FIG. 3 further depicts use of the interlocking mechanism 110, where the ear section of arm 120 is being adjusted to accommodate the 180 degree rotation of the arm 120. The arms 120 may be made of any malleable material including, but not limited to FLEXON or polycarbonate plastic that will allow for a range of motion suitable to adjust the ear portion of the arm 120 to fit the user's ear in a desired position.

Figure 4A:
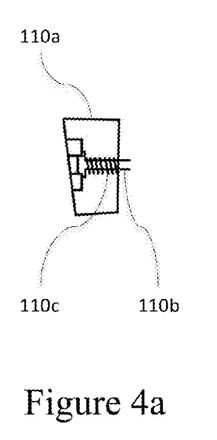
FIGS. 4a, 4b, & 4c illustrate the interlocking mechanism in its engaged, disengaged, and front view, respectively.
Figure 4B:
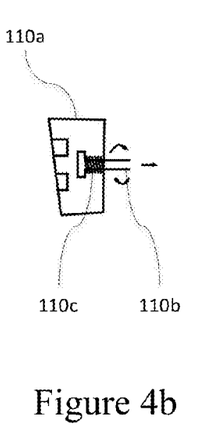
Figure 4C:
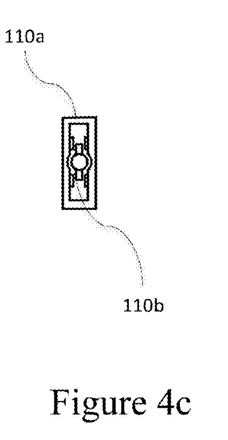

FIG. 4 depicts the interlocking mechanism 110 in its engaged position in FIG. 4a and its disengaged position in FIG. 4b. FIG. 4c is a front view of the interlocking mechanism 110 in its engaged position. Interlocking mechanism 110 is comprised of housing 110a, which houses rod 110b, and spring 110c. Interlocking mechanism 110 may connect to frame 130 via any removable or non-removable means such as hinges, screws, slots or any other means which will prevent interlocking mechanism 110 from rotating during the rotation of arms 120. In the engaged position, as represented by FIG. 4a, spring 110c is in a decompressed state surrounding rod 110b. During the decompressed state, spring 110c is at rest and spans the length of rod 110b to create friction between arms 120 and their respective interlocking mechanisms 110. Spring 110c also creates friction between rod 110b and housing 110a which is locking rod 110b in place, thus giving rise to the engaged position.

In the disengaged position, as represented by FIG. 4b, spring 110c is in a compressed state as a user pulls arm 120. Pulling of arm 120 compresses spring 110c by creating force between one side of housing 110a and rod 110b. When spring 110c is compressed, rod 110b is unlocked from the opposite side of housing 110a, which allows the user to rotate rod 110b by rotating arm 120. When the user has rotated arm 120 to its desired position, the user may stop pulling arm 120 which will cause spring 110c to decompress and rod 110b will lock back into housing 110a.

Figure 5:
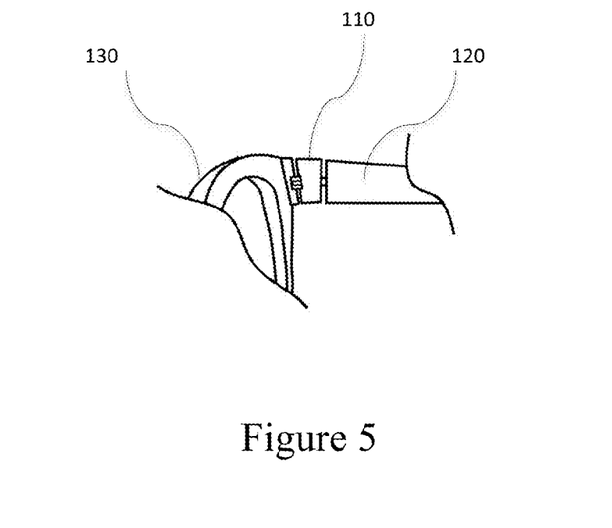
FIG. 5 illustrates a cut-away side view of interlocking mechanism in its engaged position.
Figure 6:
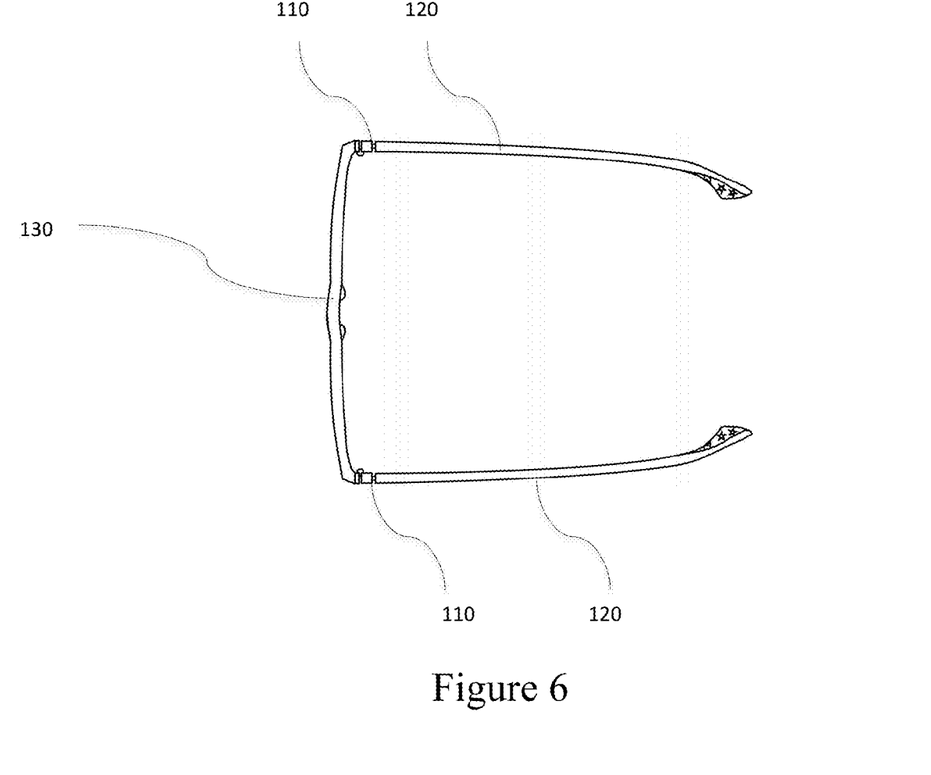
FIG. 6 depicts a top view of the optical device with the interlocking mechanism in its engaged position.
Figure 7:
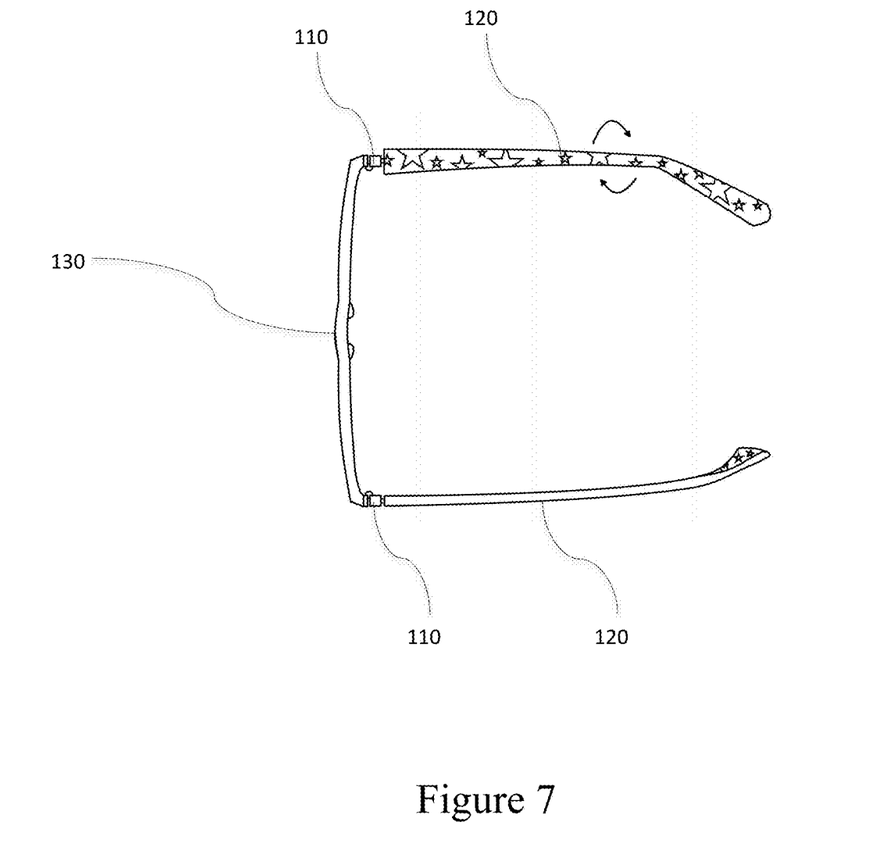
FIG. 7 depicts a top view of the optical device with the interlocking mechanism in its disengaged position allowing the arm to rotate.

FIG. 5 illustrates a cut-away side view of interlocking mechanism 110 in its engaged position. Therefore, the optical device 100 arms 120 may be rotated through a full range of three hundred and sixty degree motion by pulling (disengaging) arms 120 away from interlocking mechanism 110, rotating arms 120, and allowing the arms 120 to reengage interlocking mechanism 110 as represented in FIGS. 6 and 7.

In some embodiments, the methods may be implemented in one or more processing devices (e.g., a digital processor, an analog processor, a digital circuit designed to process information, an analog circuit designed to process information, a state machine, and/or other mechanisms for electronically processing information) to allow for digital/electronic designs or patterns to be presented on arms 120. This may be accomplished via downloads, sensors, or sharing of patterns as discussed later. The one or more processing devices may include one or more devices executing some or all of the operations of the methods in response to instructions stored electronically on an electronic storage medium, such as memory 330 shown in FIG. 8. The one or more processing devices may include one or more devices configured through hardware, firmware, and/or software to be specifically designed for execution of one or more of the operations of the methods.

Figure 8:
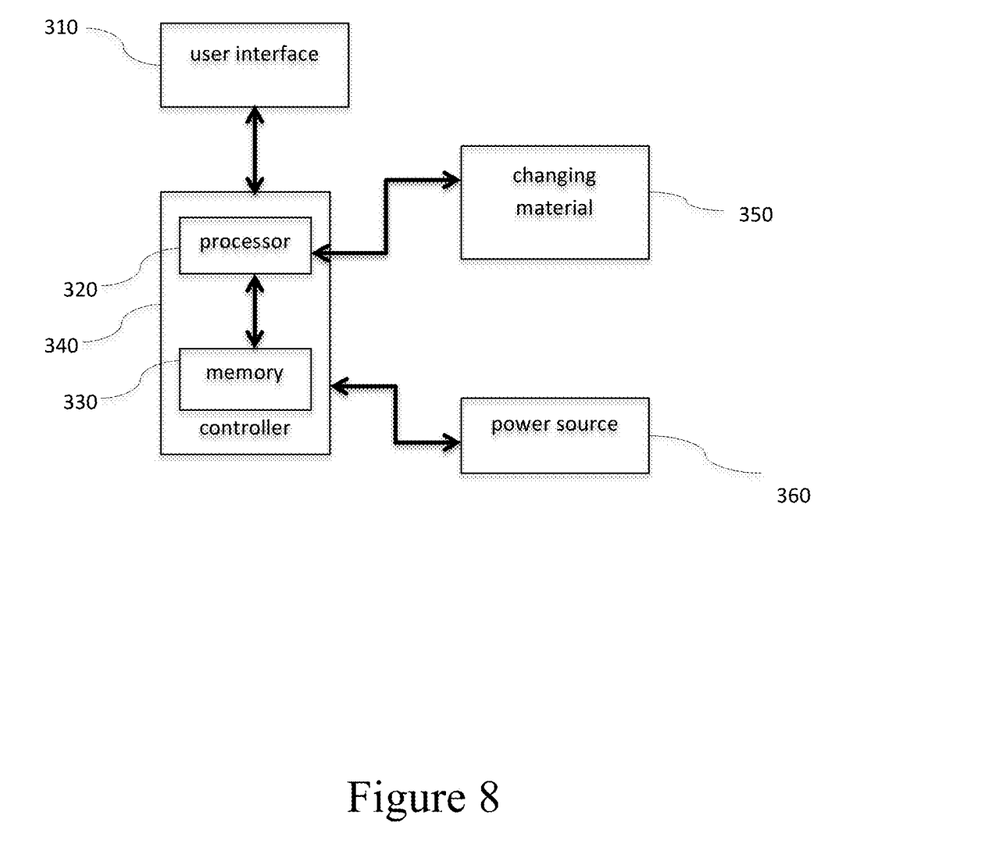
FIG. 8 is illustrative of a functional block diagram of the system.

FIG. 8 is an illustrative functional block diagram of the general system operation of the optical device 100. The components presented below are intended to be illustrative. In some embodiments, the design changes may be accomplished with one or more additional components not described, and/or without one or more of the operations discussed. The optical device 100 may include several components such as a user interface 310, processor 320, controller 340, such as a microcontroller, microprocessor, and/or the like, for controlling the optical device, memory 330, a sensor 370 (for sensing light, colors, temperature, patterns, etc.), a changing material 350, and a power source 360. All of the aforementioned components may be housed in or one optical device 100. As shown, the controller 340 is operably coupled to the user interface 310 for facilitating user interaction with the optical device 100. The controller 340 is also operably coupled to the sensor 370, changing material 350, and power source 360 for operation in accordance with the present system.

In the present example, optical device 100 may include a user interface 310 which may be housed on a suitable location of optical device 100, for the purpose of allowing the optical device 100 to change design patterns. The user interface 310 may include, but is not limited, to a button, touch screen, the interlocking mechanism 110 mentioned earlier, etc. For example, user interface 310 may be operated by engaging and disengaging interlocking mechanism 110. A one hundred and eighty degree rotation of arm 120 may evoke a different function from processor 320 than a three hundred sixty degree rotation of arm 120 or any other rotation pattern.

FIG. 8 shows the system connection and interaction of the controller 340 and various components according to at least some embodiments of this invention, and showing the signal flows in connection with optical device 100. Controller 340 includes processor 320 that executes instructions to carry out operations of controller 340 described herein. Those instructions can be stored as executable instructions and data in a memory 330 and/or may be hardwired logic within processor 320. Memory 330 also stores data as further described below. Although shown as separate blocks in FIG. 8, processor 320 and memory 330 could be implemented as part of a single integrated circuit device.

Memory 330 is operably coupled to processor 320 and is operable to store instructions and data, such as operating instructions, to be executed by the controller 340 for operation as described. The memory 330 may also be operable to store pattern and color relationship information, such as contrasting and complementary color or pattern arrangements. A manner of operating the user interface 310 may allow a user to select one or more alternate patterns that are related (e.g., analogous, complementary, etc.) to other patterns. For example, the user may interact with the user interface 310 by rotating the arms 120 via the interlocking mechanism 110, one or more times within a period of time, to select a desired pattern. Based on this information, the changing material 350 may change design to reflect a desired pattern.

Changing material 350 may include electro-chromic material, thermo-chromic material, electronic ink or LED type sources. In one embodiment, the changing material may be one or more RGB triplets of LED lights to facilitate a multiplicity of color options. The RGB triplets may be embedded in one or more portions of the frame 130 or arms 120 of optical device 100 to facilitate color/pattern change of optical device 100.

In an embodiment wherein a thermo-chromic material is used in the optical device, appropriate resistors may be incorporated therein. A resistive material may be included in frames 130 of the optical device so that current sources may be placed at several distal positions such as at the end of the arms 120 and/or at the lower corners of the front frame 130. In this way, the current flows to a sink at the top front and in the process cause the thermo chromic material to change color/pattern.

In another embodiment, the changing material may be the electro-chromic material. A thin layer of this non-conducting material may be incorporated between two conducting electrodes. By an appropriate voltage placed thereon by the controller 340, the electro-chromic material may change color as desired to produce a specific pattern. During the intermediate-mode or the off-mode, the charge may readily be maintained on the electrodes by an open circuit condition.

As explained more fully below, controller 340 is configured to control operations of optical device 100. Controller 340 communicates instructions to changing material 350 and is configured to receive signals from user interface 310. In a similar manner, controller 340 communicates with and/or supplies power, from the power source 360, to changing material 350. Power source 360 may be any internal/external battery or electrical power source as mentioned below.

Power may be in the form of electrical, solar, or other types of power sources, which are apparent to a person having ordinary skill in the art. Alternate embodiments may include a power source of a different technology, known now or in the future. In response to control signals and/or power from controller 340, the changing material 350 changes color or design pattern. So as to avoid unnecessary drawing detail, certain conventional components have been omitted from FIG. 8. For example, connections to an external power supply (e.g., to a source of 120V AC power) and components for distributing electrical power to controller 340 and other components of optical device 100 (e.g., AC/DC converter and power supply, distribution wiring, etc.) are not shown.

Figure 9:
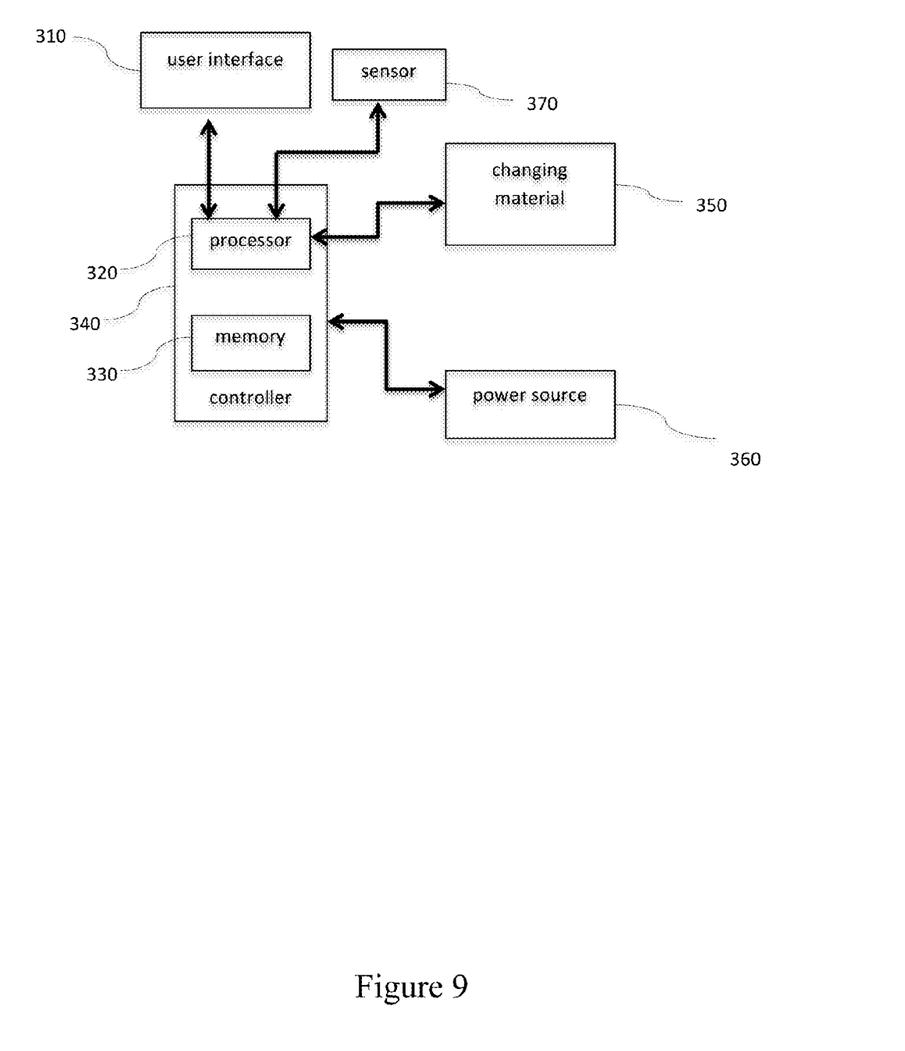
FIG. 9 is illustrative of a functional block diagram of the system that includes a sensing device.

Referring to FIG. 9, an illustrative functional block diagram of the present system is shown including a sensor. The sensor(s) 370 may include the ability to sense light, colors, temperature, patterns or a combination of the previous. Various other sensors 370, now known or later developed, may be used to provide a signal to controller 340 to effectual a change in the changing material 350 of optical device 100 in conjunction with the user interface 310. Numerous commercially developed types of sensors 370 and associated electronics are known in the art and thus not further described here. Sensor 370 may be a temperature sensor located on one of the optical device 100 arms 120 so that it is in close proximity to the user's head while the optical device 100 is being worn. A temperature sensor 370 may be used to help determine the design pattern associated with optical device 100. For instance, a user's elevated body temperature may be sent from sensor 370 to controller 340. If the user has associated a threshold temperature with a particular design stored in memory 330, then changing material 350 will take on the stored design as sent from the processor 320.

In an alternate embodiment using sensor 370, where sensor 370 detects patterns, changing material 350 may change based on the type of pattern it senses. For example, sensor 370 may detect a polka dot pattern on a separate article. This detection may be sent from sensor 370 to controller 340. The polka dot pattern would then be stored in memory 330, then changing material 350 will take on the stored polka dot pattern sent from the processor 320 when the user has indicated such via the user interface 310. In the same or a further embodiment, a user may desire other patterns be exhibited by the pattern changing material 350 that complement a color or pattern of an object of personal use. For example, a plaid optical device may complement a single color pattern; or a red patterned optical device may complement a black dress and so on.

In yet another embodiment a sensor 370 which detects various types of light (ie: infrared, direct sun-light, ambient, etc.) or illumination levels within an environment may communicate with the controller 340 to manage further pattern change, power consumption, or memory operations.

Figure 10:
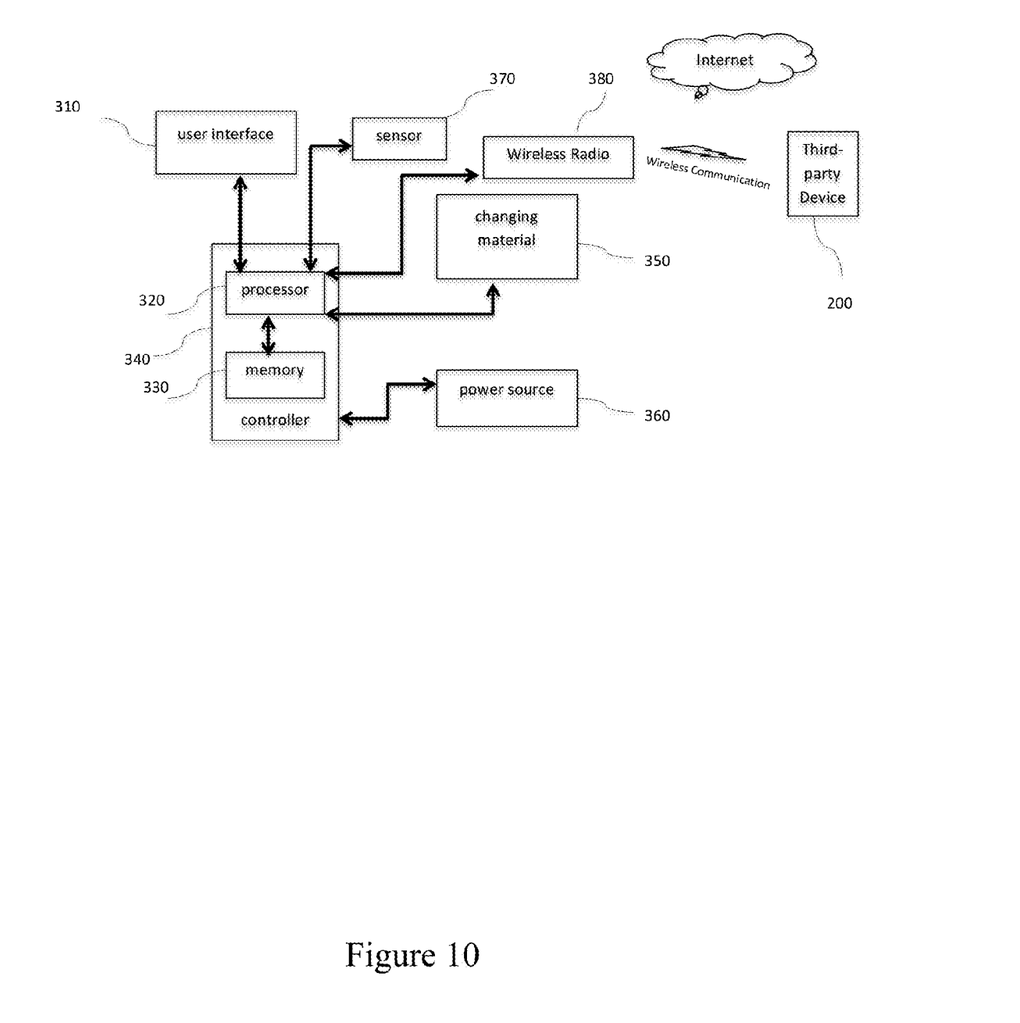
FIG. 10 is illustrative of a functional block diagram of the system comprising a wireless communication means.

FIG. 10 is an illustrative diagram showing bi-direction communication between the optical device 100 and a third-party device 200. The third-party device 200 may be another optical device 100, personal digital assistant (PDA), mobile device, or the like. Optical device 100 may take on the electronic skin or design of third-party device 200 via a communication means such as: Bluetooth, RFID, zigby, Wi-Fi, near-field communication (NFC), etc. For example, NFC technology may allow an optical device 100, placed in close proximity to the third-party device 200, to communicate wirelessly with the third-party device 200 when the third-party device 200 also has a wireless means of communication.

As shown in FIG. 10, wireless radio 380 is in communication with third-party device 200, according to the invention. The wireless radio 380 transfers and receives instruction, commands and data from third-party device 200 for use by processor 320. For example, a user of optical device 100 may want to acquire the skin or design of a third-party device 200. The processor 320 may initiate operations input by the user at user interface 310 to connect to the third-party device 200 and retrieve and the skin or design to be stored in memory 330. From there, the user may invoke processor 320 to call the design from memory 330 and display the design via changing material 350.

In one embodiment, NFC technology may be used to facilitate contact free communication between multiple optical devices or other objects equipped with NFC technology via a transceivers and receivers. The information/data transferred via NFC may contain details relating to pattern selection, pattern storage, operating status, etc. Information/data communicated via NFC, may then be stored in memory 330 or to be communicated to the controller 340 to effectuate a change in the material 350. Furthermore, optical device 100 may be sent an electronic skin or design wirelessly via bi-directional communication, by a third-party device 200 regardless of proximity to said third-party device 200. This may be accomplished via the internet or any server client architecture.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An optical device comprising:
    a frame, an interlocking mechanism, and at least one arm, where the interlocking mechanism attaches the frame to the at least one arm, and the interlocking mechanism allows for rotation of the at least one arm;
    a processor and associated digital memory;
    the arms of the optical device comprising a changing material capable of changing colors and patterns on the surface of the arms of the optical device;
    the optical device in bi-directional wireless communication with a device exterior to the optical device;
    upon initiation by an operation input, recalling a design from a digital memory; and
    displaying the design received from the digital memory through changes in the changing material of the at least one arm of the optical device.

2. The optical device of claim 1, comprising a solar powered energy means.

3. The optical device of claim 1, wherein the at least one arm comprises a flexible material.

4. The optical device of claim 1, comprising a sensor used to facilitate pattern changes of the optical device.

5. The optical device of claim 4, wherein the sensor is a temperature detection sensor.

6. The optical device of claim 4, wherein the sensor is a light detection sensor.

7. The optical device of claim 4, wherein the sensor is pattern detection sensor.

8. The optical device of claim 1, where the device communicates wirelessly utilizing any one of Bluetooth technology, Near Field Communication (NFC) technology, Radio Frequency ID technology, Zigbee Technology, or Wi-Fi technology.

9. The optical device of claim 1, where placing the optical device in close proximity to the third-party device permits the optical device to communicate wirelessly with said third-party device when the third-party device is capable of wireless communication.

10. The optical device of claim 1, where the operation input comprises the pulling and rotating of the at least one arm, receiving a command from a user from a third party device, or receiving a wireless communication from a sensor to effect a change in the changing material of the optical device to facilitate a design change by requesting and accepting a design from a third-party device and causing the changing material to change color and/or pattern in response to the received design through changes in the changing material of the at least one arm of the optical device.

11. An optical system comprising:
    pulling and rotating at least one arm via an interlocking mechanism attached to a frame and at least one arm of an optical device having a processor and an associated digital memory;
    the at least one arm of the optical device comprising a changing material capable of changing colors and patterns on the surface of the arms of the optical device;
    the optical device in bi-directional wireless communication with sensor or a third-party device;
    upon initiation by an operation input, recalling a design from a digital memory; and
    displaying the design recalled from the digital memory.

12. The system of claim 11, where the operation input comprises the pulling and rotating of the at least one arm, receiving a command from a user from a third party device, or receiving a wireless communication from a sensor to effect a change in the changing material of the optical device to facilitate a design change by requesting and accepting a design from a third-party device and causing the changing material to change color and/or pattern in response to the received design through changes in the changing material of the at least one arm of the optical device.

13. The system of claim 12, wherein the design change mimics an environment by causing color and/or pattern changes in the changing material based upon instructions about an environment transmitted from a third-party device to the optical device.

14. The system of claim 12, wherein the design change is based on a persona where the persona is associated with predefined pattern selections and color selections and is transmitted from said third-party device to the optical device.

15. The method of claim 11, where the pulling and rotating of the at least one arm stores a design in the memory.

16. The method of claim 11, where the pulling and rotating of the at least one arm requests a design from a third-party device.

17. The system of claim 11, where the operation input comprising pulling and rotating of the at least one arm sends a request for one or more designs to a third-party device based upon the rest position of the at least one arm.

18. The system of claim 11, where the device communicates wirelessly utilizing any one of Bluetooth technology, Near Field Communication (NFC) technology, Radio Frequency ID technology, Zigbee Technology, or Wi-Fi technology.

19. The system of claim 11, where placing the optical device in close proximity to the third-party device permits the optical device to communicate wirelessly with said third-party device when the third-party device is capable of wireless communication.

\* \* \* \* \*